United States Patent [19]

Bruhn, Jr.

[11] 3,828,625

[45] Aug. 13, 1974

[54] ADJUSTABLE LINKAGE

[75] Inventor: Max R. Bruhn, Jr., Spring Lake, Mich.

[73] Assignee: Grand Haven Stamped Products Company, Grand Haven, Mich.

[22] Filed: Apr. 23, 1973

[21] Appl. No.: 353,603

Related U.S. Application Data

[62] Division of Ser. No. 200,357, Nov. 19, 1971, Pat. No. 3,765,264.

[52] U.S. Cl............... 74/512, 74/424.8 R, 74/522, 74/560
[51] Int. Cl............................................ G05g 1/14
[58] Field of Search....... 74/424.8 R, 512, 522, 525, 74/560

[56] References Cited
UNITED STATES PATENTS

| | | | |
|---|---|---|---|
| 2,588,165 | 3/1952 | Rossmann...................... | 74/424.8 R |
| 2,621,538 | 12/1952 | Bechman et al................. | 74/512 |
| 3,269,199 | 8/1966 | Deehan et al.................. | 74/424.8 R X |
| 3,301,088 | 1/1967 | White............................ | 74/424.8 R X |
| 3,394,614 | 7/1968 | Zeidler......................... | 74/522 |
| 3,643,524 | 2/1972 | Herring.......................... | 74/560 X |
| 3,643,525 | 2/1972 | Gibas........................... | 74/512 |
| 3,691,868 | 9/1972 | Smith........................... | 74/512 |
| 3,765,264 | 10/1973 | Bruhn, Jr....................... | 74/512 |

Primary Examiner—Allan D. Herrmann
Attorney, Agent, or Firm—Price, Heneveld, Huizenga & Cooper

[57] ABSTRACT

The present invention discloses an adjustable linkage mechanism adapted for use with foot-operated pedals, i.e., brake, accelerator and clutch, of a motor vehicle. The spacing between the seat of a motor vehicle and the pedals may be varied to suit the requirements of an individual operator through use of an actuator mechanism operatively connected between the pedal arm and the associated linkage mechanisms. Basically, the invention provides a powered means for automatically lengthening or shortening the associated linkage to pivot the pedal either toward or away from the seat to vary the spacing therebetween.

3 Claims, 5 Drawing Figures

PATENTED AUG 13 1974

ADJUSTABLE LINKAGE

CROSS-REFERENCE TO RELATED APPLICATION

This is a division of application Ser. No. 200,357, filed Nov. 19, 1971 now U.S. Pat. No. 3,765,264 issued Oct. 16, 1973.

BACKGROUND OF THE INVENTION

Recent years have seen increasing emphasis placed on automotive safety, particularly with respect to features dealing with the safety of the occupant of the vehicle in the event of an accident. Padded dashboards and sun visors, breakaway steering wheels and telescopic steering columns are some of the past innovations to provide occupant safety. If the fairly recent past, seat belts and shoulder harness restraining devices have won wide acclaim from the various safety councils. More recently, an instantaneously inflatable bag has been proposed and developed to inflate and fill the space between the passenger and the dashboard of the vehicle in the event of a collision. While all of the above safety features and devices have contributed greatly to the reduction in deaths related to automobile accidents, much yet remains to be done with respect to passenger safety.

The mounting and operation for a front seat in an automobile is now subject to close scrutiny as regards passenger safety. In a conventional automobile, the front seat is generally positioned for adjustment on a track mechanism so that it may be moved toward and away from the control pedals to suit the needs of an individual operator. The track mechanism upon which the seat is mounted has a lower portion fixed to the floor and framework of the automobile. The seat itself is fixed on an upper track member which is mounted for relative movement with respect to the lower track so that the seat may be moved toward and away from the dashboard. When the seat is moved to its rearward position, upon an occurance of abrupt stopping of the automobile such as happens in a collision, the seat will often either pull loose from its mountings or overcome the locking mechanisms on the track and slide forward toward the dashboard, thereby increasing the likelihood of injury or perhaps even death of the occupant. Obviously therefore, it would be most desirable to fixedly secure the entire seat structure to the framework of the automobile to prevent this happening. When the seat is so fixed, however, it remains necessary to provide some sort of adjustment whereby the spacing between the seat and the operating pedals may be varied to accommodate different operators. Various mechanisms have been proposed to vary this spacing. One such arrangement involves the shifting of the pedal arms together with their pivoted mounting point on the dash panel or fire wall toward or away from the seat. This causes problems with respect to the linkage mechanisms as provisions must be made to accommodate changes in the relative length of the linkage mechanism and of the control cables to the carburetor. Such systems, therefore, become quite bulky and complex and have not met with success or acceptance by the automotive industry.

SUMMARY OF THE INVENTION

Basically, the present invention provides a linkage adjustment apparatus connected in the control linkage between the operating or control pedals in an automobile and the controlled device such as the brake master cylinder, the clutch or the carburetor. The linkage adjustment apparatus varies the effective length of the connecting linkages, and causes the operating pedals to pivot about their mounting axis toward and away from the vehicle seat.

The linkage mechanisms are connected to the respective control pedals or pedal arms through an adjustable actuator mechanism One end of the actuator is connected by means of a clevis to the pedal arm while the opposite end is fastened to the associated connecting linkages. The linkage is in the form of an extended rod, threaded on the end which extends into the actuator. When energized, the actuator follows along the threaded portion driving it into or out of the actuator to thereby vary the effective length of the linkage. This movement causes a corresponding pivotal movement of the associated pedal and support shaft to move the pedal toward or away from the seat to vary the spacing between the pedal and the seat.

Accordingly, it is an object of the present invention to provide an arrangement whereby the operating pedals of a motor vehicle may be adjusted to vary the spacing between the pedals and the driver's seat.

It is another object of the present invention to provide an apparatus to vary the effective length of the control linkage mechanisms associated with the operating pedals of an automobile.

It is a related object of this invention to provide an adjustment for the foot-operated controls of an automobile so that the seat may be firmly fixed to the frame of the vehicle while yet maintaining provision of relative adjustment of the pedals to accommodate the individual operator.

BRIEF DESCRIPTION OF THE DRAWINGS

The invention will now be described with reference to the accompanying drawings in which.

DESCRIPTION OF THE PREFERRED EMBODIMENT

Figure 1:
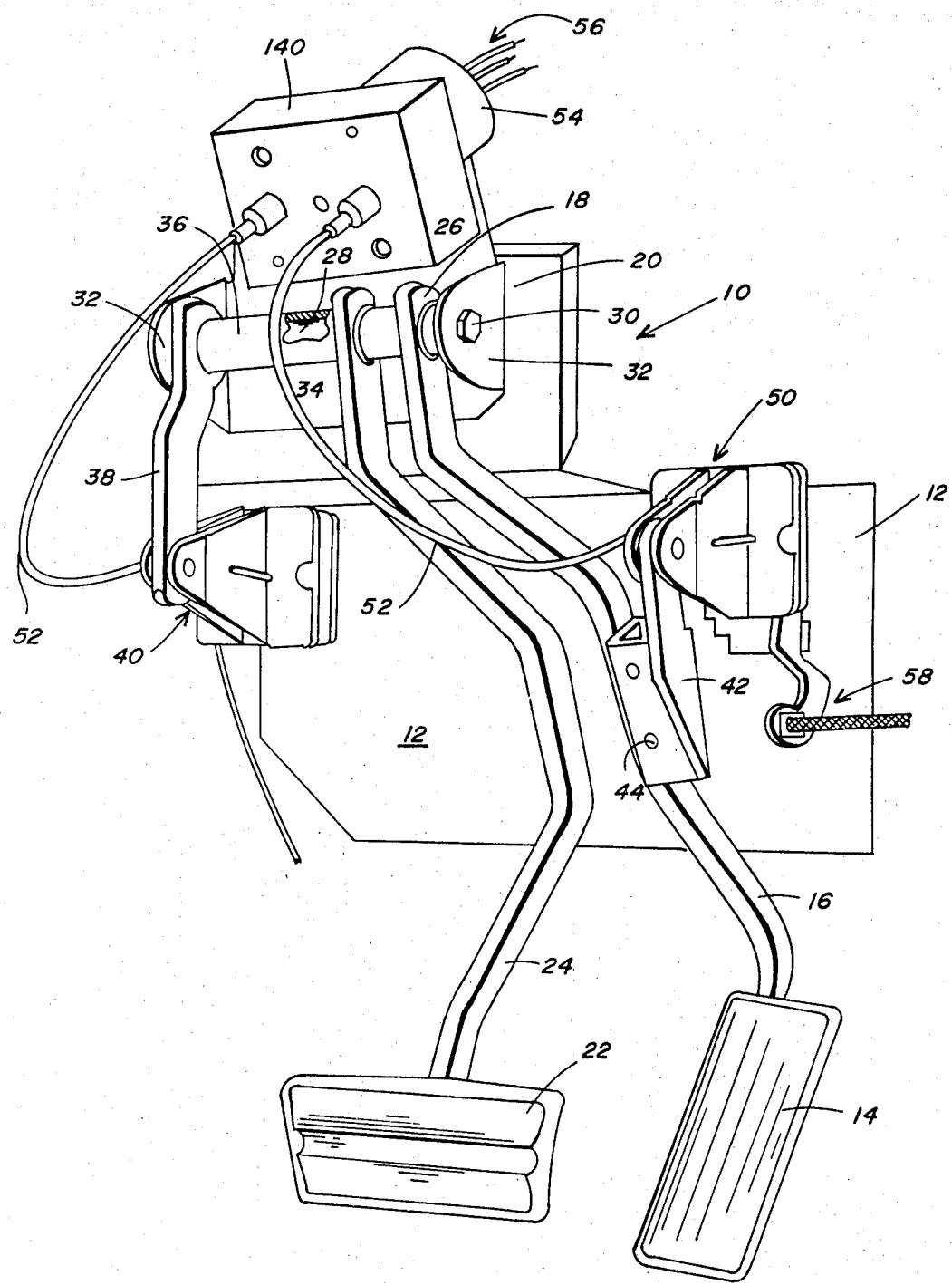
FIG. 1 is a perspective view of the invention illustrating a brake and accelerator pedal pivotally mounted on the dash panel or fire wall of a vehicle.

Referring now to the drawings and to FIG. 1 in particular, the numeral 10 indicates the brake and accelerator operating pedals pivotally mounted on the dash panel or fire wall 12 of a conventional automobile.

The accelerator pedal 14 is mounted in a conventional manner on one end of an accelerator pedal arm 16. The pedal arm 16 extends upwardly from the pedal 14 and is pivotally mounted at its opposite end 18 on a shaft 28 fixed in a bracket member 20 at an upper portion of the dash panel 12.

The brake pedal 22 is securely fixed at one end of a brake pedal arm 24 which similarly extends upwardly where it is pivotally mounted at its opposite end 26 in the bracket member 20 on a common shaft 28.

The shaft 28 is held in the bracket 20 by means of screws 30 or other conventional fastening means which pass through a pair of outwardly extending ears 32 forming side walls of bracket 20. The shaft 28 is fixedly mounted between the ears 32 and the pedal arms 16 and 24 are provided with collar members 34 and 36, respectively, which are fixed in the ends 18 and 26 of the pedal arms to allow free rotation about the shaft 28. A spacer washer 29 is positioned on the shaft between the collars 34 and 36. The shaft 28 provides an upper pivot point for the pedal arms 16 and 24 in a conventional well-known manner. The pedal arm bracket 20 may be mounted at an upper portion of the fire wall or dash panel 12 or conveniently fixed under the dashboard of the vehicle to suit the particular requirements of various automobiles as will be obvious to those skilled in the art.

A downwardly extending arm 38 is attached to the collar 36 associated with the brake pedal arm 24 and is movable about the pivot shaft 28 with movement of the brake arm 24. The arm 38 extends downwardly a slight distance from the pivot shaft 28 where it is connected to a brake linkage actuator member 40 which will be described in more detail hereinafter.

The accelerator pedal arm 16 is provided with an upwardly and outwardly extending flange member 42 fixed on the pedal arm in any convenient manner such as by screws 44. The flange 42 is fixed at its extended end to a carburetor linkage actuator member 50. The linkage adjusting actuator members 40 and 50 are each driven through flexible drive shafts 52 which are powered by reversible drive motor 54. Drive motor 54 may be mounted under the dashboard of the vehicle in any convenient manner and is electrically controlled through a conventional switch member (not shown) which is connected to the input wires 56. The wires 56 connected to a suitable power source through the switching means provide forward and reverse drive of the motor 54 to extend or retract the actuator. Also located on the fire wall 12 is the accelerator cable pivot control 58 which will be described more fully in connection with FIG. 3.

Figure 2:
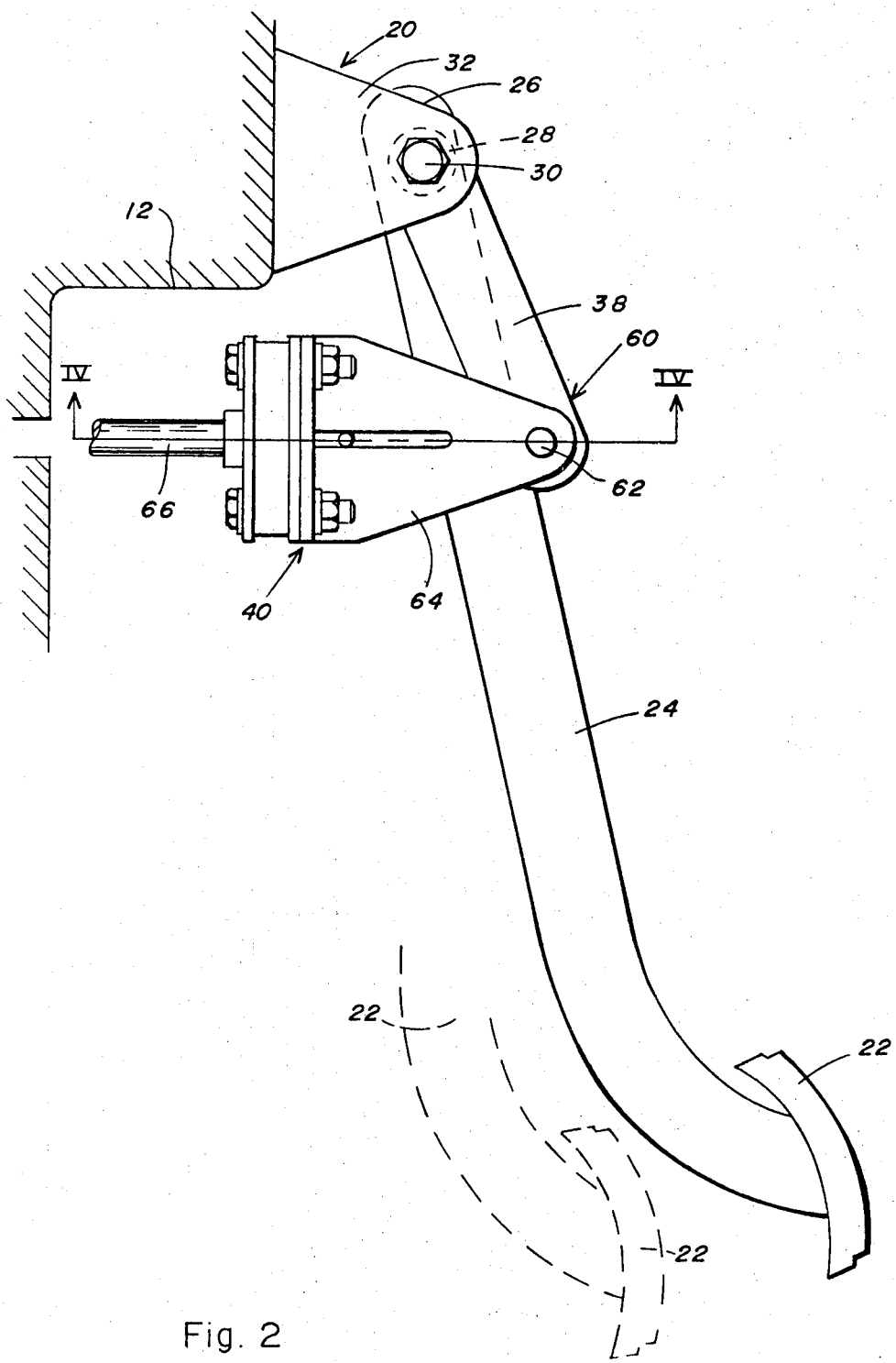
FIG. 2 is a side elevational view illustrating the brake pedal and associated operating mechanisms.

Referring now to FIG. 2, a side plan view of the brake arm and actuator is shown. As described above in connection with FIG. 1, the brake arm 24 and secondary arm 38 are pivotally mounted about shaft 28 in bracket 20. One end 60 of the downwardly extending arm 38 is connected by means of a pin 62 and a clevis 64 which forms a part of the actuator 30. The clevis 64, as a part of the actuator 40, forms an adjustable operating linkage between the brake arm and the brake pedal push rod 66 which extends through the fire wall 12 to the brake master cylinder (not shown). As is conventional, pressure applied on the brake pedal 22 (to the left as viewed in FIG. 2) will cause movement of the arms 24 and 38 about shaft 28 and a corresponding movement of the brake pedal push rod 66.

Figure 3:
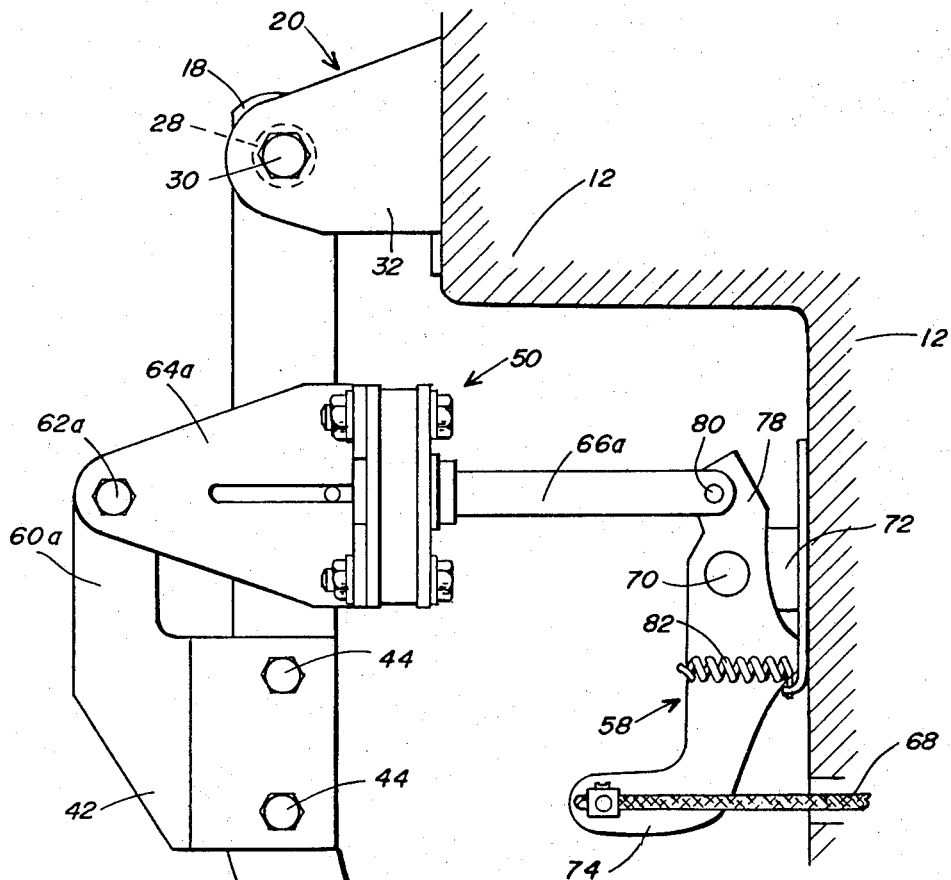
FIG. 3 is a side elevational view similar to FIG. 2 illustrating the accelerator pedal and its associated operating mechanisms.
Figure 3:
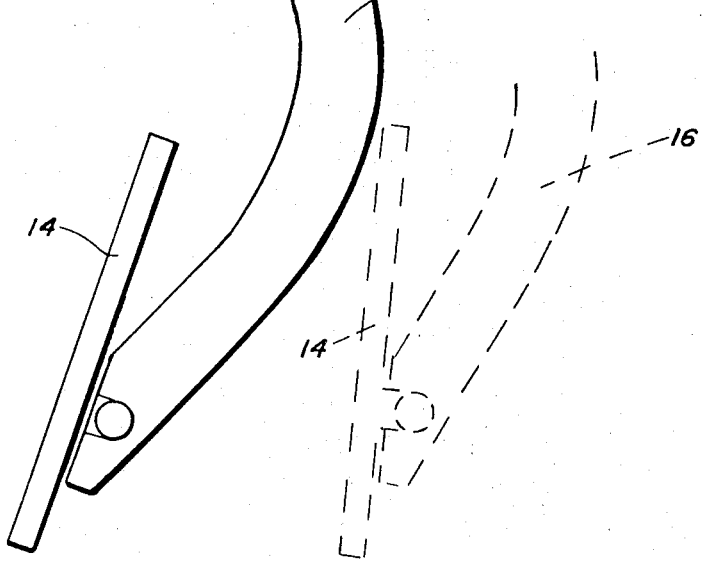

Referring briefly to FIG. 3, the arrangement of the accelerator operating control pedal previously described in connection with FIG. 1 is illustrated in a side view similar to FIG. 2. The accelerator pedal 14 and pedal arm 16 are pivotally mounted about shaft 28 in bracket 20 fixed to the fire wall 12. The flange 42 fixed to the pedal arm 16 extends upwardly where it is connected by means of a pin and clevis to the actuator 50.

Each of the actuators 40 (FIGS. 1 and 2) and 50 (FIGS. 1 and 3) are similar in construction and similarly provide a means for adjusting the linkage mechanism associated therewith. Like reference numerals will therefore be utilized to illustrate the similar component parts with those particularly related to the accelerator mechanism bearing the suffix letter $a$. The end of the actuator opposite to that connected to the flange at 60a by the pin 62a and clevis 64a is connected to a push rod 66a.

In that the carburetor linkage as provided in present-day automobiles is generally actuated by a cable assembly which imparts a pulling action against a spring bias to the carburetor rather than a pushing action as used to actuate the brake master cylinder, it is necessary to change the inward movement of the accelerator pedal (to the right as viewed in FIG. 3) to an outward movement of the accelerator cable 68. This is accomplished through the use of a bellcrank 58 pivotally mounted by a pin member 70 on bracket 72 fixed on the firewall 12. A lower extending end 74 of the bellcrank is fixed to the accelerator cable 68 which passes through the fire wall where it is operatively connected to the carburetor (not shown). The opposite end of the bellcrank 78 is connected to an accelerator push rod 66a by means of a pin 80. A bias spring 82 is fixed to the bellcrank 58 and the bracket 72 to bias the bellcrank to an upright position. The bias spring 82 is provided in addition to the bias normally provided on the carburetor or on the accelerator cable to bias the carburetor to a normal idling position and may be required due to the additional weight of the actuator 50 acting against the bellcrank.

The actuators 40 and/or 50 connected to the push rods 66 or 66a provide a unique connection between the push rod and the clevis 64 and serve to shorten or lengthen the push rod associated therewith. The extension of the push rod 66 causes a corresponding decrease in the distance of the pedal 14 or 22 from the seat. As stated in other words, the increase in the length of the push rod will cause a corresponding increase in the distance of the pedal from the fire wall. Because of the positioning of the actuator, push rod and clevis on the arm near the pivot point, it may be readily seen that an increase in the length of the pivot rod will cause the arm to pivot outwardly on an axis about shaft 28. Because of the length of the arm, the pedal itself will move an even greater distance. It may readily be seen that a small increase in the length of the push rod of, for example, one inch, will result in an approximately three-inch travel of the pedal. This, of course, may be varied depending upon the positioning of the clevis with respect to the pivot shaft 28 and is also dependent upon the length of the arm. The significant feature, however, is the adjustability of the length of the push rod 66a and of the actuator mechanism to accomplish such adjustment. To those skilled in the art, the actuator mechanism when utilized to adjust the length of the push rod can best be described as an adjustable clevis assembly and will be sometimes referred to as such for purposes of illustration.

Referring now to FIGS. 2 through 5, the actuator or adjustable clevis assembly of the present invention will be described in greater detail. One end of the actuator is pivotally fixed by means of a pin 62 and a clevis 64 to an extension of the brake or accelerator pedal arm 60. The opposite end of the actuator is fixed to the push rod 66 by means of captive nut and gear combination held by the clevis 64.

The clevis is basically in the form of a pair of elongated spaced-apart side wall flanges 100 which extend a distance from their connection with the arm 64 and pin 62. The side walls 100 are bent outwardly, away from each other, forming a pair of oppositely directed flanges 102 adjacent to which is positioned a first gear mounting plate 104. A second gear mounting plate 106 is spaced a slight distance from the first plate by means of four spacers 108 located between the plates 104 and 106. A plurality of bolts 110 or other suitable fastening means pass through the flanges 102, mounting plate 104, spacers 108 and second mounting plate 106 where they are secured by means of nuts 112 to form a gear housing 114. The plates 104 and 106 are substantially identical in construction and each are provided with aligned large diameter central bores 114 and 116, respectively. Spaced from the central bore in each mounting plate are a pair of aligned smaller diameter bores 118 and 120. The aligned bores, form bearing surfaces for a pair of mating spur gears 122 and 124. Gear 124 is a driven gear and of a larger diameter than drive gear 122. The driven gear 124 is provided with an internally threaded, outwardly extending, hub 126. The outer diameter of the hub 126 is finish machined and adapted for mounting and rotation within the large diameter central bores 114 and 116 formed in the mounting plates 104 and 106. Drive gear 122 is also provided with an integrally formed outwardly extending hub 128 and is similarly adapted for rotational movement in the smaller diameter bores 118 and 120.

The flexible drive assembly 52 (FIG. 1) has an outer casing 130 and a flexible inner drive shaft 132. The outer casing 130 is fixed to the flange 102 and mounting plate 104 while the internal drive shaft 132 extends through the bore into the hub of the drive gear 122 where it is fixed to the drive gear to cause rotation thereof when energized by the motor 54 (FIG. 1).

An elongated slot 134 is provided along a portion of the length of the side wall flanges 100 of the clevis in alignment with the center axis of the bores 114 and 116. The push rod 66 is threaded along a portion of its length 136 and extends through the threaded hub 126 of the driven gear 124 and into the space between the clevis side walls 100. Near the end of the push rod 66, a pin 138 is passed therethrough transverse to its length and extends into the slots 134. The pin 138 prevents rotation of the push rod 66 and, in addition, provides a positive stop to limit the amount of linear travel of the rod within the actuator along the slots 134.

The opposite end of the flexible drive cable assembly 52 is connected in a conventional manner to a gear reduction unit 140 (FIG. 1) which is operatively connected to drive motor 24. The gear reduction unit is provided with suitable gearing so that the flexible drive shafts 52 each rotate in the same direction and at the same speed with respect to each other when the motor 54 is energized.

OPERATION

Referring specifically to FIGS. 2 and 3, the operation of the adjustable linkage will be described in detail. For ease of illustration, the actuator 40 or 50, illustrated in FIGS. 2 and 3 is shown in extended position, that is, with the operating pedals moved nearest the seat and at their furthest distance from the dash panel 12. The illustration in FIG. 4 shows the actuator in its retracted position wherein the pedals are at their furtherest distance from the seat and closest to the fire wall.

Figure 5:
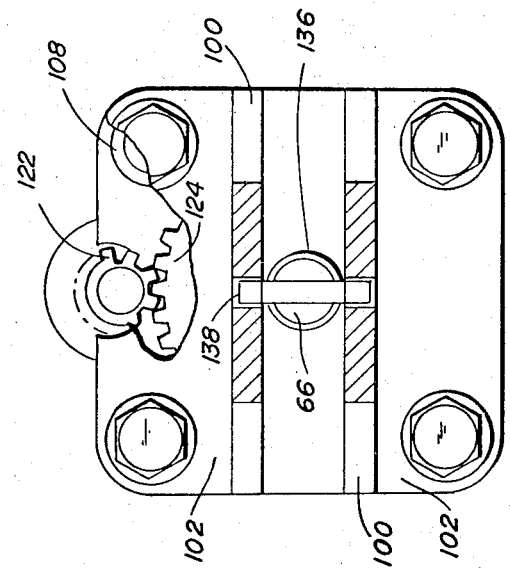
FIG. 5 is a cross-sectional view taken along the plane V—V of FIG. 4.
Figure 4:
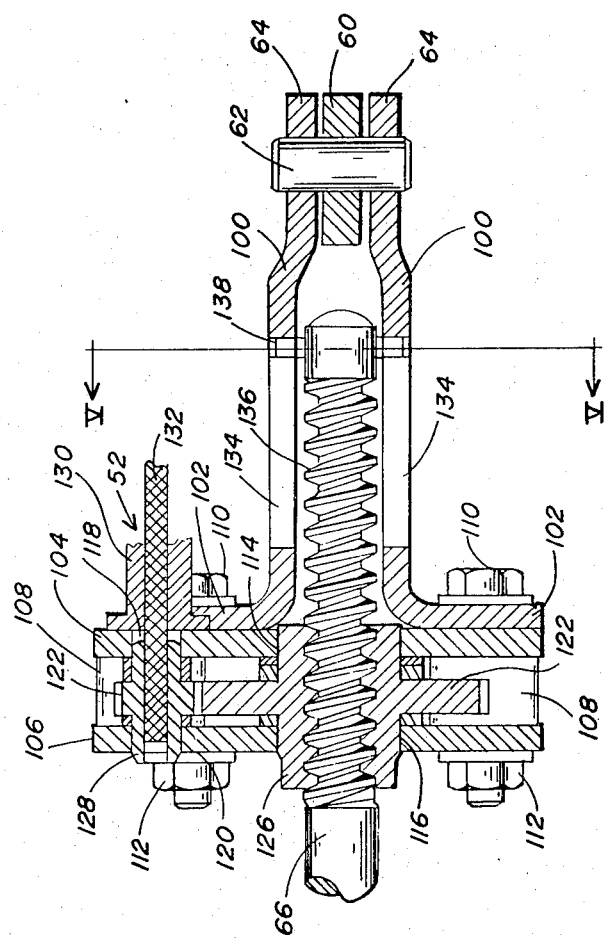
FIG. 4 is a cross-sectional view of the actuator element taken along the plane IV—IV of FIG. 2.

Operation of the actuator then, serves to move the push rod 66 from the position shown in FIGS. 2 and 3 to that shown in FIG. 4. When it is desired to change the position of the operating pedals with respect to the seat, reversible drive motor 54 is energized by suitable conventional electronic controls such as, for example, a push button (not shown). Rotation of the motor 54 through the gear reduction unit 140 causes rotation of the flexible drive shafts 132 which, in turn, cause rotation of drive gear 122 (FIGS. 4 and 5). There is, of course, a corresponding rotation of gear 124 which, through its threaded hub 126, rotates about the threaded portion 136 of push rod 66. When the drive motor is energized with the actuator in the position illustrated in FIGS. 2 and 3, the drive gear rotates about push rod 66 causing the end thereof to be progressively advanced through the interaction of the threaded hub of the driven gear 122 and the threaded portion 136 of the push rod 66. The push rod is driven through the hub and into the space between the side walls 100 of the clevis. The push rod may advance into the clevis any desirable distance or until the pin 138 contacts the end of the elongated slot 134. At this point, the pedals will have moved from the position illustrated in FIGS. 2 and 3 to the position illustrated in phantom in those views. Rotation of the drive motor 54 in the opposite direction will cause movement of the push rod and a corresponding movement of the operating pedals in the opposite direction, i.e., toward the seat.

A similar actuating mechanism may be connected to the operating linkage of a clutch control pedal generally found in automobiles having a standard transmission. As will be obvious to those skilled in the art, the adjustment of the operating pedals may be accomplished through the use of a manually operated hand wheel or lever rather than through the use of a reversible drive motor as illustrated. It will, however, become immediately obvious to those skilled in the art that the present invention provides a considerably simplified and novel apparatus for adjusting the relative length of connecting linkages. It will also become obvious to those skilled in the art that the linkage adjustment mechanism, as described above, is particularly adaptable for use for adjusting the foot operated pedals in a motor vehicle.

While the invention has been described with relation to a particular apparatus for adjusting the linkages, it is obvious that other mechanical arrangements could be employed without departing from the spirit of the invention. For example, individual drive motors 54 could be provided to drive each of the actuators associated with the various operating pedals. In addition, a worm and gear combination or a rack and gear combination could be utilized in the actuator for extending or retracting the push rod. Other variations and modifications will be suggested to those skilled in the art without departing from the scope of the invention which is defined by the following claims.

The embodiments of the invention in which an exclusive property or privilege is claimed are defined as follows:

1. An adjustable member for an operating pedal of an automotive vehicle, said operating pedal including an arm member pivotally mounted about an axis and linkage means connected by said adjustable member to said arm member between said axis and said pedal, the improvement in said adjustable member comprising:
- a housing adapted for connection to said arm member;
- a screw mounted in said housing extending outwardly therefrom connected to said linkage;
- a gear having an internally threaded hub portion rotatably supported in said housing threadably engaging said screw; and
- reversible drive means connected to said gear to rotate same to extend and retract said screw to vary the length of said linkage and thereby urge said pedal to pivot about said axis.

2. An adjustable member as described in claim 1 wherein said linkage means is a push rod operatively connected to the controlled elements of the vehicle, and said screw is formed on said push rod.

3. The apparatus of claim 2 wherein said drive means is an electric motor.

* * * * *